(12) United States Patent
Jegal et al.

(10) Patent No.: US 11,408,864 B2
(45) Date of Patent: Aug. 9, 2022

(54) QUALITATIVE AND QUANTITATIVE ANALYSIS METHOD FOR HIGH MOLECULAR WEIGHT ADDITIVE BY USING SIZE-EXCLUSION CHROMATOGRAPHY-PYROLYSIS-GAS CHROMATOGRAPHY/MASS SPECTROMETRY

(71) Applicant: LG Chem, Ltd., Seoul (KR)

(72) Inventors: Seonyoung Jegal, Daejeon (KR); Byoung Hyoun Kim, Daejeon (KR); Dong Hyun Kim, Daejeon (KR); Yura Lee, Daejeon (KR); Hyun Sik You, Daejeon (KR)

(73) Assignee: LG Chem, Ltd.

( * ) Notice: Subject to any disclaimer, the term of this patent is extended or adjusted under 35 U.S.C. 154(b) by 139 days.

(21) Appl. No.: 16/963,685

(22) PCT Filed: Oct. 10, 2019

(86) PCT No.: PCT/KR2019/013248
§ 371 (c)(1),
(2) Date: Jul. 21, 2020

(87) PCT Pub. No.: WO2020/076075
PCT Pub. Date: Apr. 16, 2020

(65) Prior Publication Data
US 2021/0080433 A1     Mar. 18, 2021

(30) Foreign Application Priority Data

Oct. 11, 2018  (KR) .................. 10-2018-0120966
Oct. 8, 2019   (KR) .................. 10-2019-0124406

(51) Int. Cl.
*G01N 30/12*  (2006.01)
*G01N 30/86*  (2006.01)
*G01N 30/72*  (2006.01)

(52) U.S. Cl.
CPC ......... *G01N 30/12* (2013.01); *G01N 30/7206* (2013.01); *G01N 30/8631* (2013.01); *G01N 2030/125* (2013.01)

(58) Field of Classification Search
CPC .............. G01N 30/12; G01N 30/7206; G01N 30/8631; G01N 2030/125;
(Continued)

(56) References Cited

FOREIGN PATENT DOCUMENTS

JP    2000146938 A    5/2000
JP    2000321258 A    11/2000
(Continued)

OTHER PUBLICATIONS

Coulier et al., "Identification and quantification of (polymeric) hindered-amine light stabilizers in polymers using pyrolysis-gas chromatography-mass spectrometry . . . . ," Journal of Chromatography A, vol. 1062, Iss. 2, doi:10.1016/j.chroma.2004.11.013, Jan. 14, 2005. (Year: 2005).*

(Continued)

*Primary Examiner* — Jennifer Wecker
*Assistant Examiner* — Michael Paul Shimek
(74) *Attorney, Agent, or Firm* — Lerner, David, Littenberg, Krumholz & Mentlik, LLP

(57) ABSTRACT

A method for securing qualitative and quantitative information of a high molecular weight additive in a polymer resin sample is disclosed herein. In some embodiments, the method includes separating a fraction of a polymer resin sample using size exclusion chromatography (SEC), wherein the fraction corresponding to a high molecular weight additive, pyrolyzing the fraction in a pyrolysis-gas (Continued)

chromatography/mass spectrometer (Py-GC/MS) to obtain a mass spectrum of the pyrolyzed fraction; identifying a structure of the high molecular weight additive by comparing m/z values for fragment peaks in the mass spectrum to m/z values for fragment peaks in a mass spectrum of a standard, and determining the amount of the high molecular weight additive in the polymer resin sample, relative to the total weight of the polymer resin sample by comparing a sum of areas of the fragment peaks to a calibration line of the standard.

11 Claims, 9 Drawing Sheets

(58) Field of Classification Search
CPC ..... G01N 2030/047; G01N 2030/8405; G01N 2030/885; G01N 30/88
See application file for complete search history.

(56) References Cited

FOREIGN PATENT DOCUMENTS

| | | |
|---|---|---|
| JP | 2012208081 A | 10/2012 |
| JP | 2016194490 A | 11/2016 |

OTHER PUBLICATIONS

"Analysis of High Molecular Weight Hindered Amine Light Stabilizers (HALS), GF-310 HQ." Additives in Hydrophobic Polymers, 2020, 1 page.

Brander et al., The identification and quantification of a high molecular weight light stablizer in polycarbonate by application of an online coupling of size exclusion chromatography in stopped flow mode with pyrolysis gas chromatography time of flight mass spectroscopy, Journal of Chromatography A. Oct. 3, 2014, pp. 309-312, vol. 1362.

Coulier et al., "Identification and quantification of (polymeric) hindered-amine light stabilizers in polymers using pyrolysis-gas chrormatography-mass spectrometry and liquid chromatography-ultraviolet absorbance detection-evaporative light scattering detection," Journal of Chromatography A, Dec. 2, 2004, pp. 227-238, vol. 1062.

International Search Report for Application No. PCT/US2019/013248 dated Jan. 30, 2020, 3 pages.

Jansson, et al., "Determination of polymer additives using analytical pyrolysis," Journal of Analytical and Applied Pyrolysis, May 1, 2007, pp. 353-361, vol. 79.

Kaal et al., On-line size exclusion chromatography-pyrolysis-gas chromatography-mass spectrometry for copolymer characterization and additive analysis, Journal of Chromatography A, Mar. 2, 2007, pp. 182-189, vol. 1143.

\* cited by examiner

[Fig. 1a]
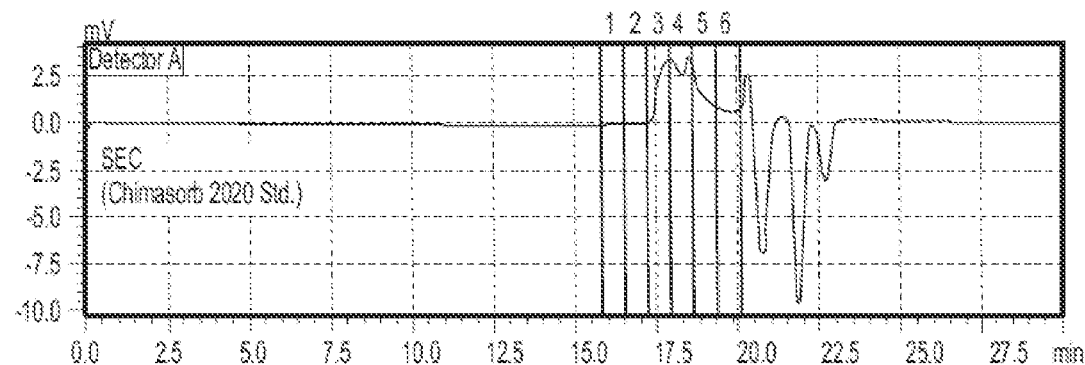
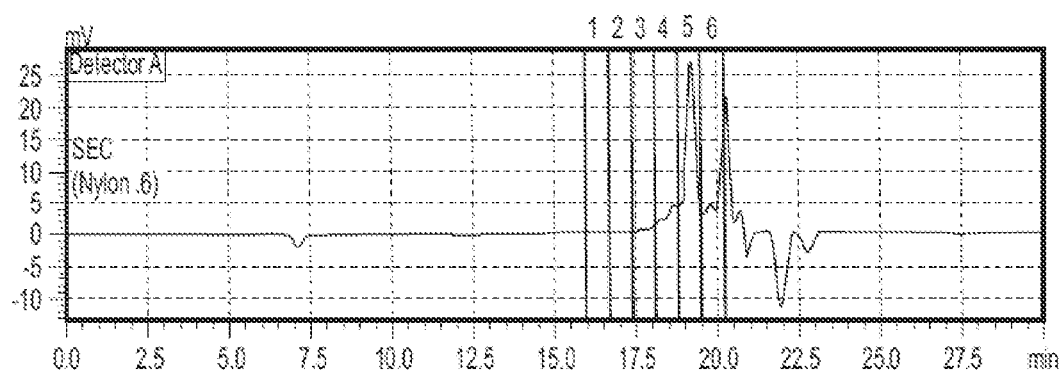
[Fig. 1b]
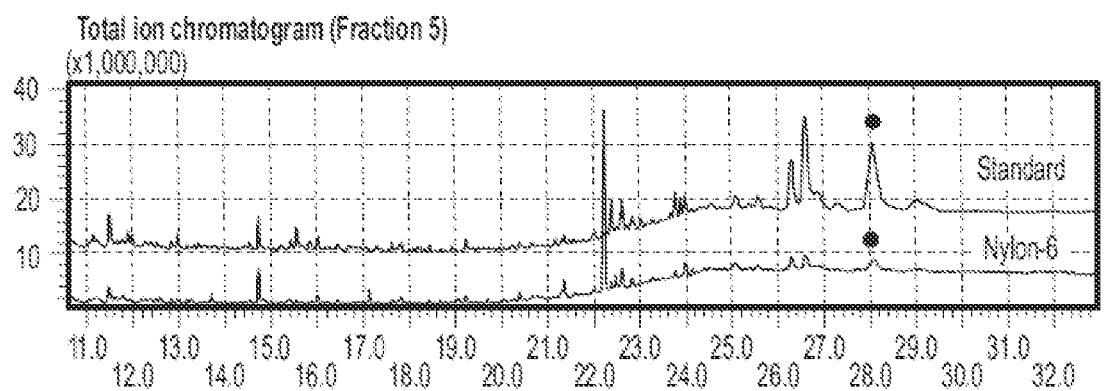

[Fig. 1c]
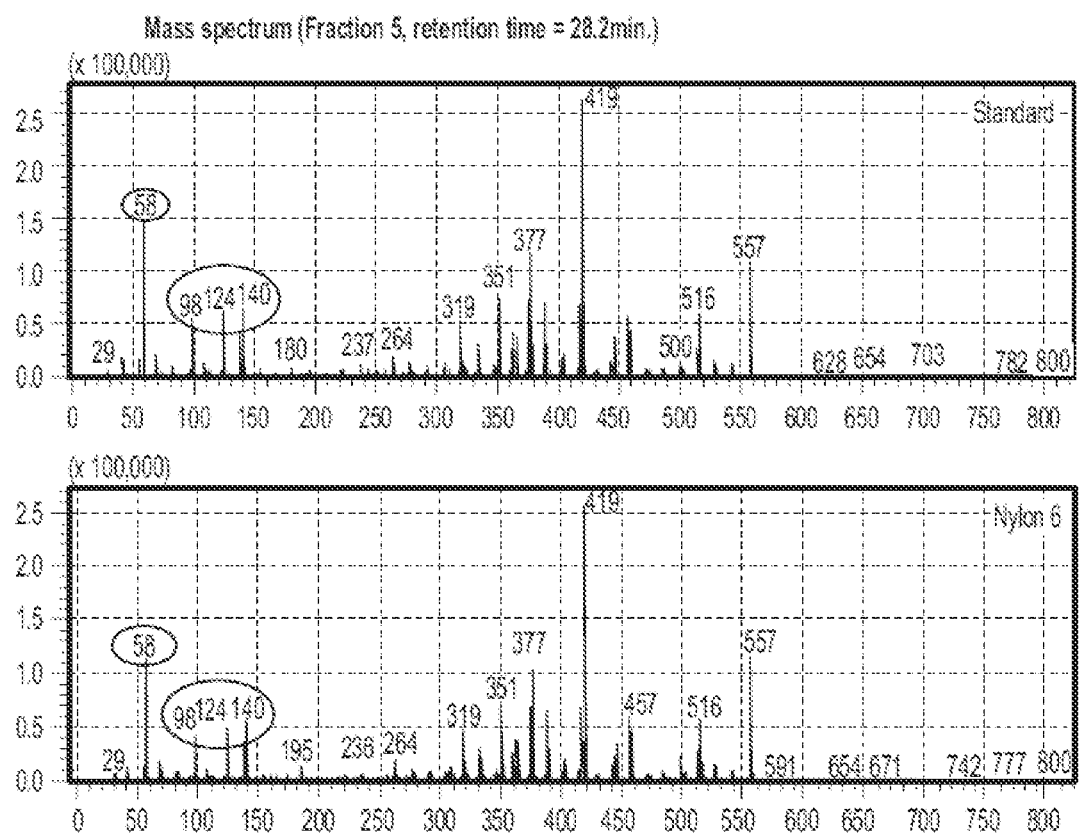
[Fig. 2]
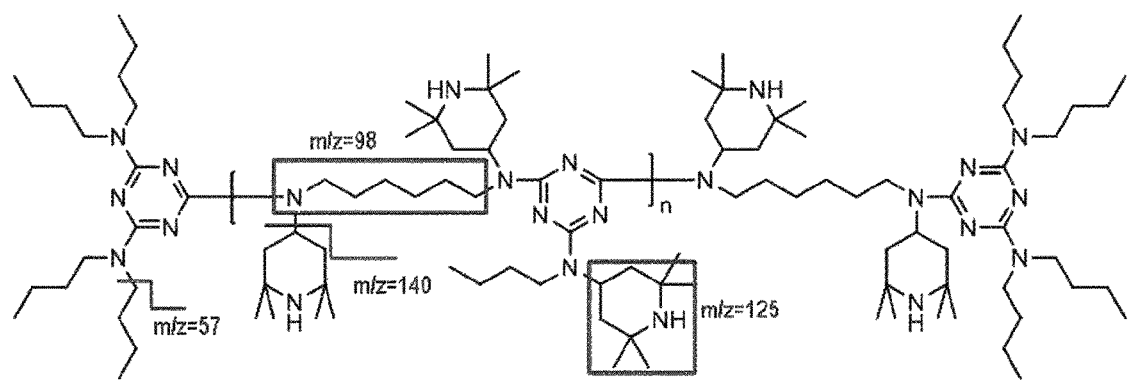
Chimasorb 2020 (M.W. 2600~3400)

[Fig. 3a]
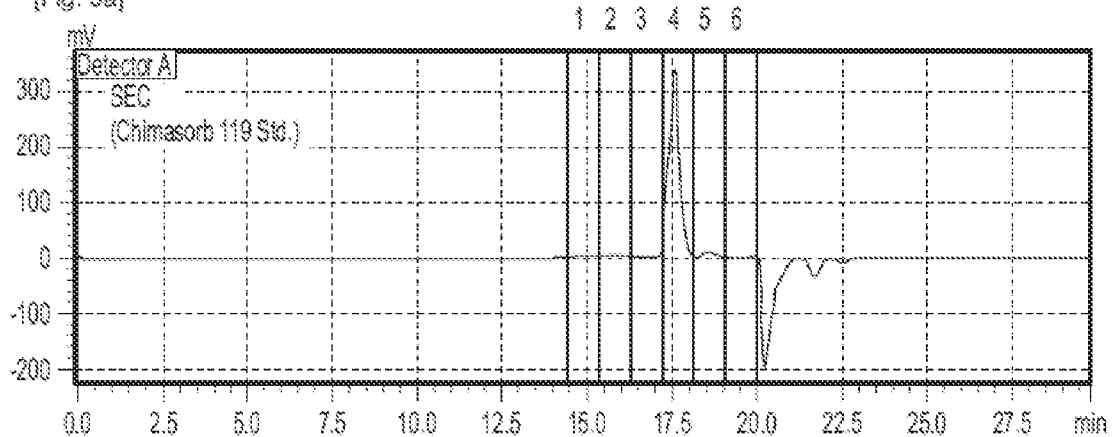
[Fig. 3b]
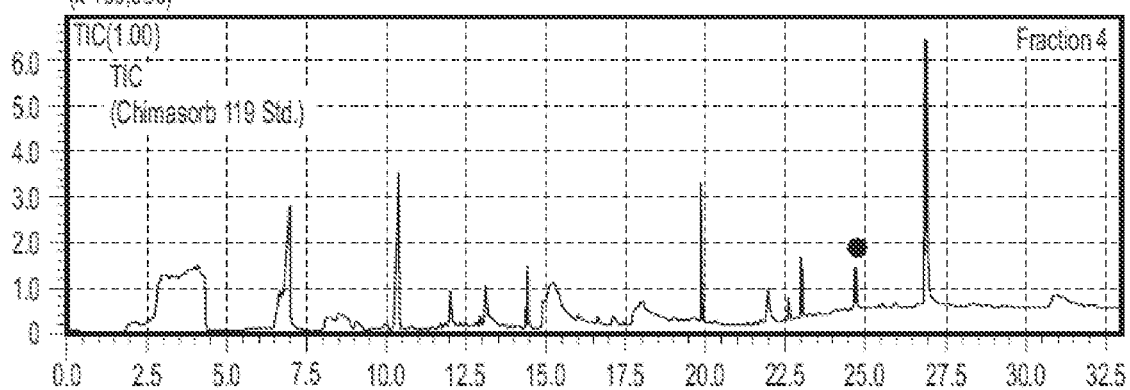
[Fig. 3c]
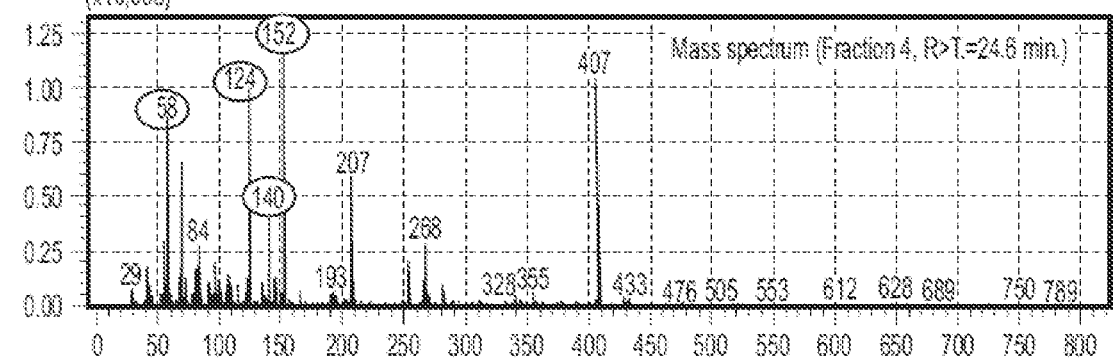

[Fig. 3d]
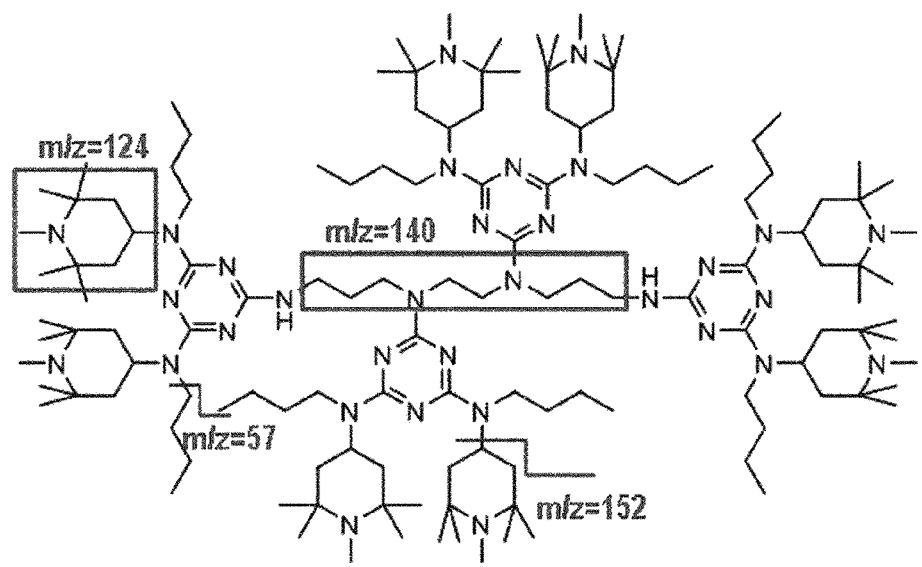
Chimasorb 119 (M.W. 2285.68)
[Fig. 4a]
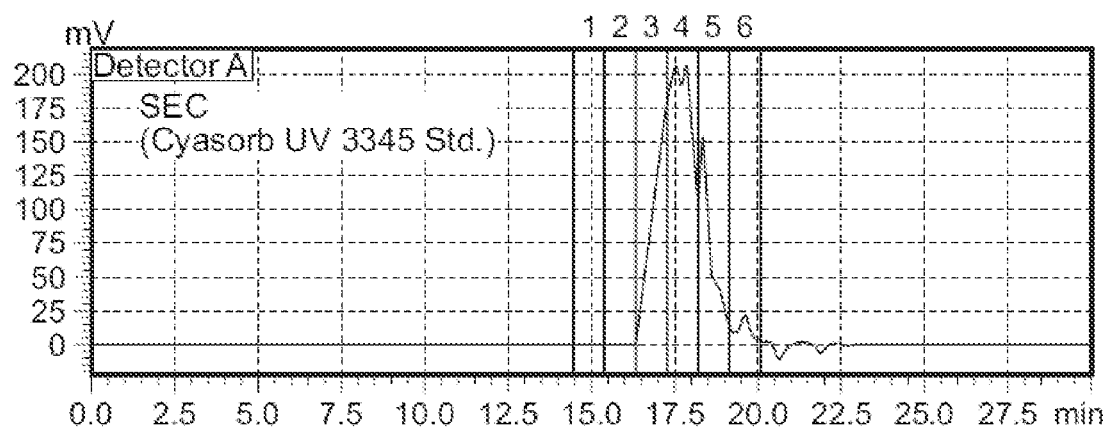

[Fig. 4b]
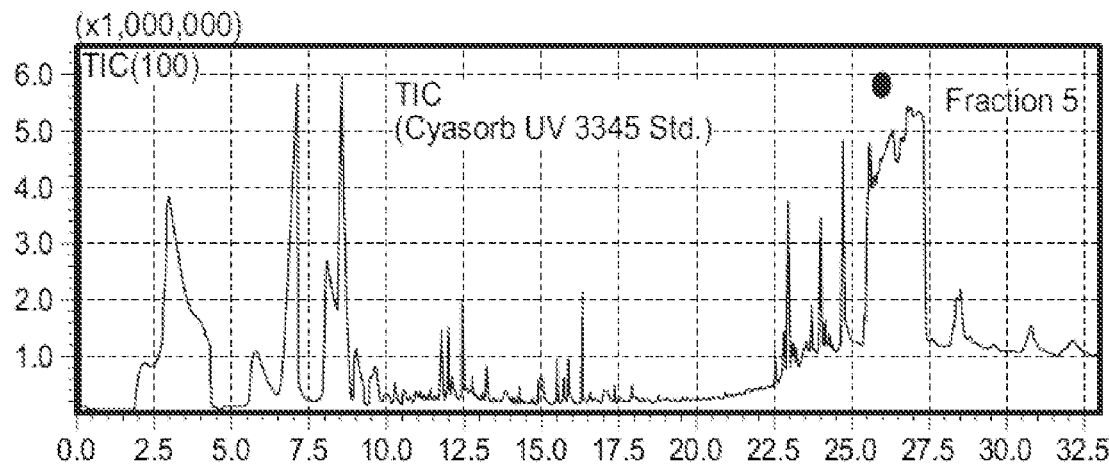
[Fig. 4c]
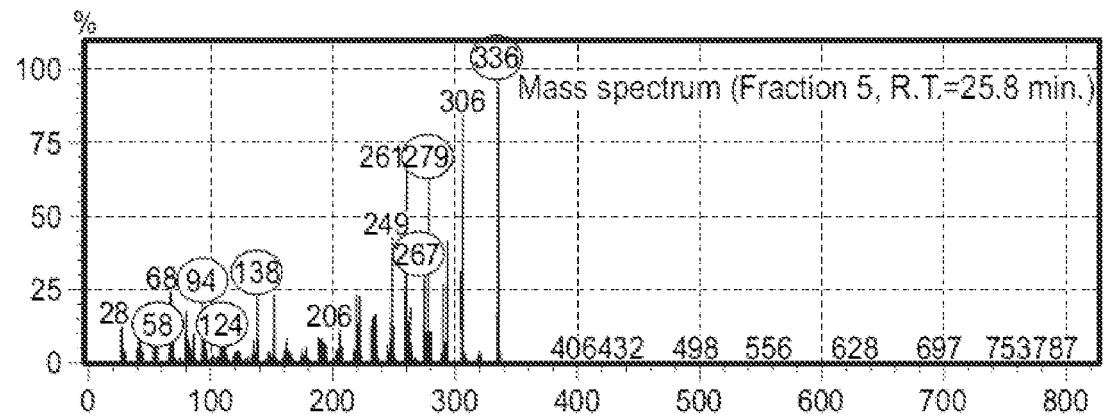
[Fig. 4d]
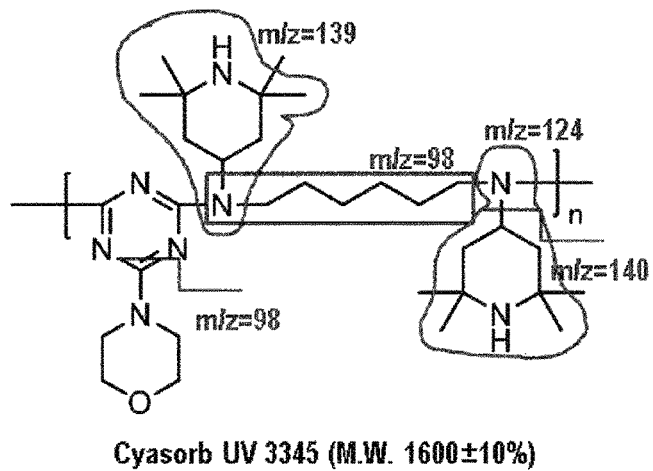
Cyasorb UV 3345 (M.W. 1600±10%)

[Fig. 5a]
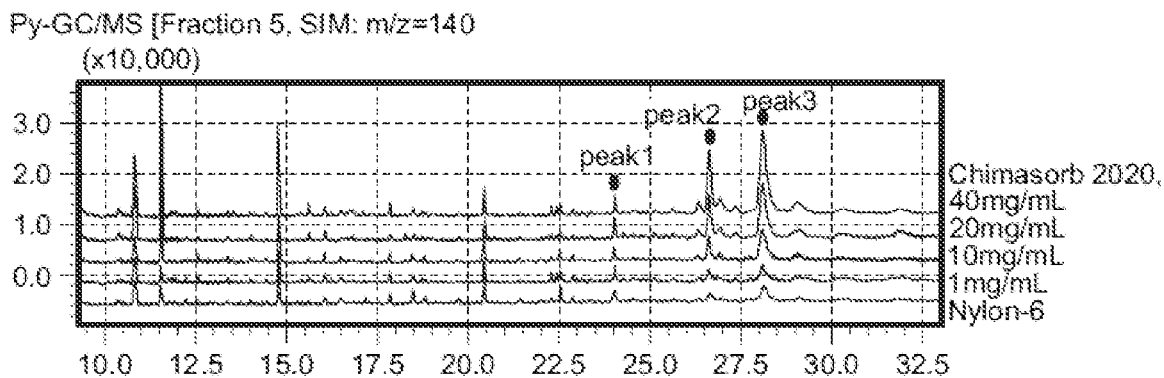
[Fig. 5b]
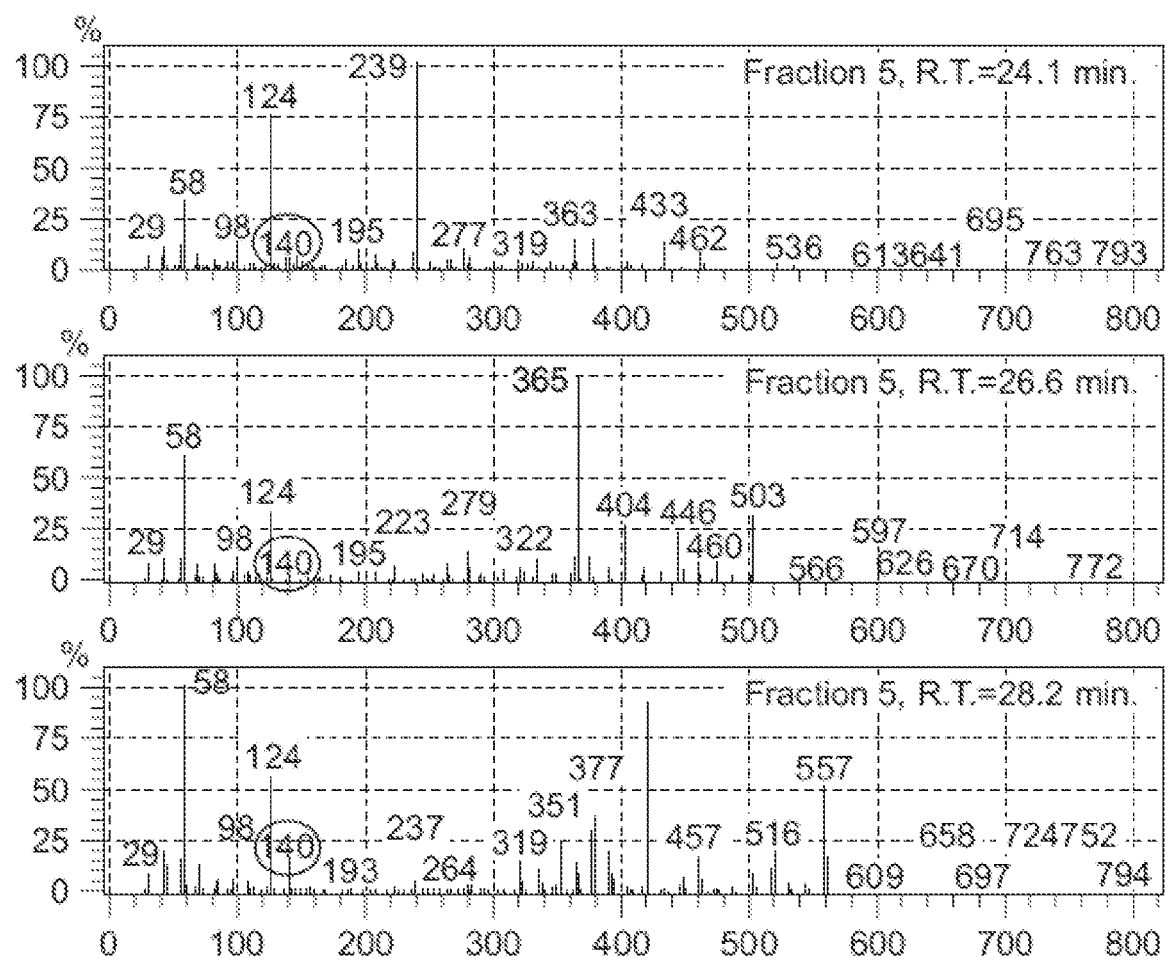

[Fig. 6]
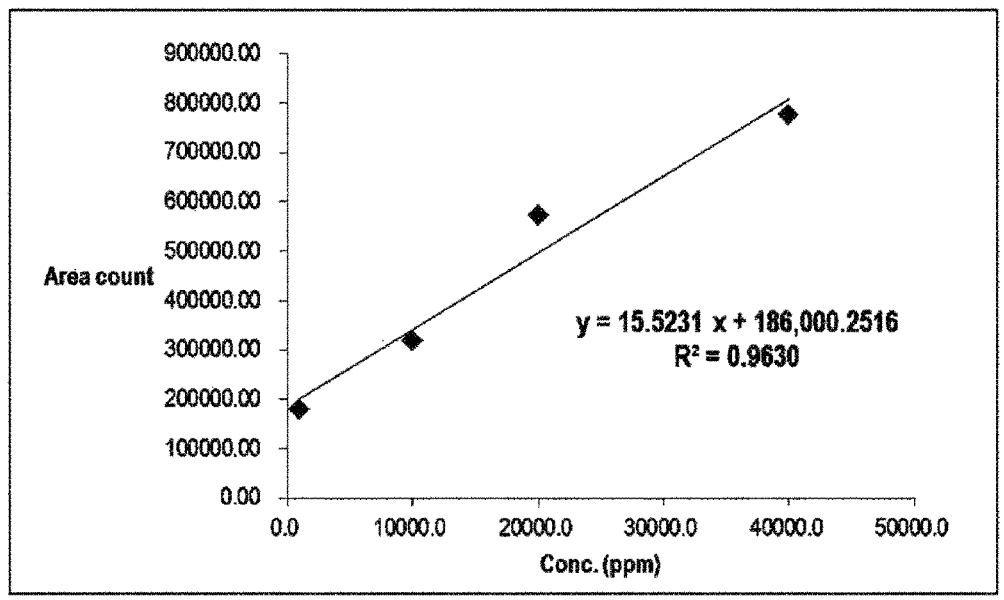
[Fig. 7]
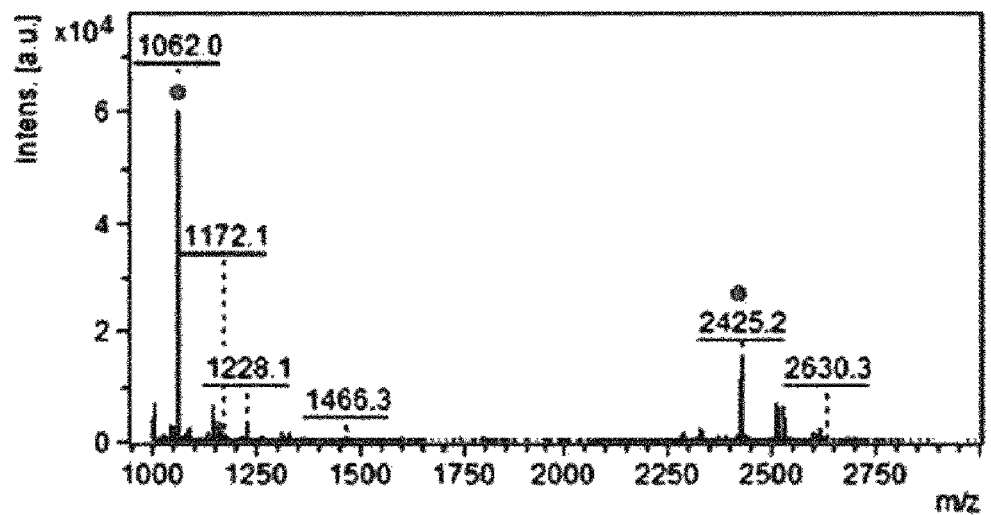

[Fig. 8a]
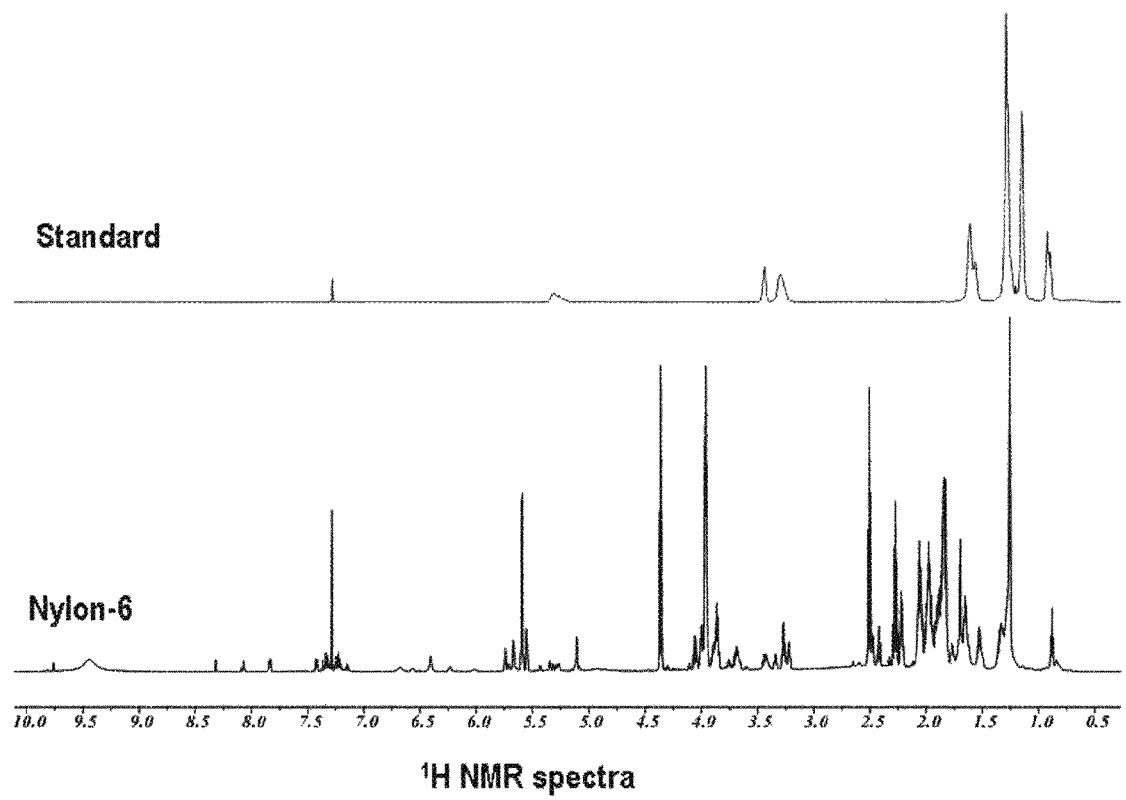

[Fig. 8b]
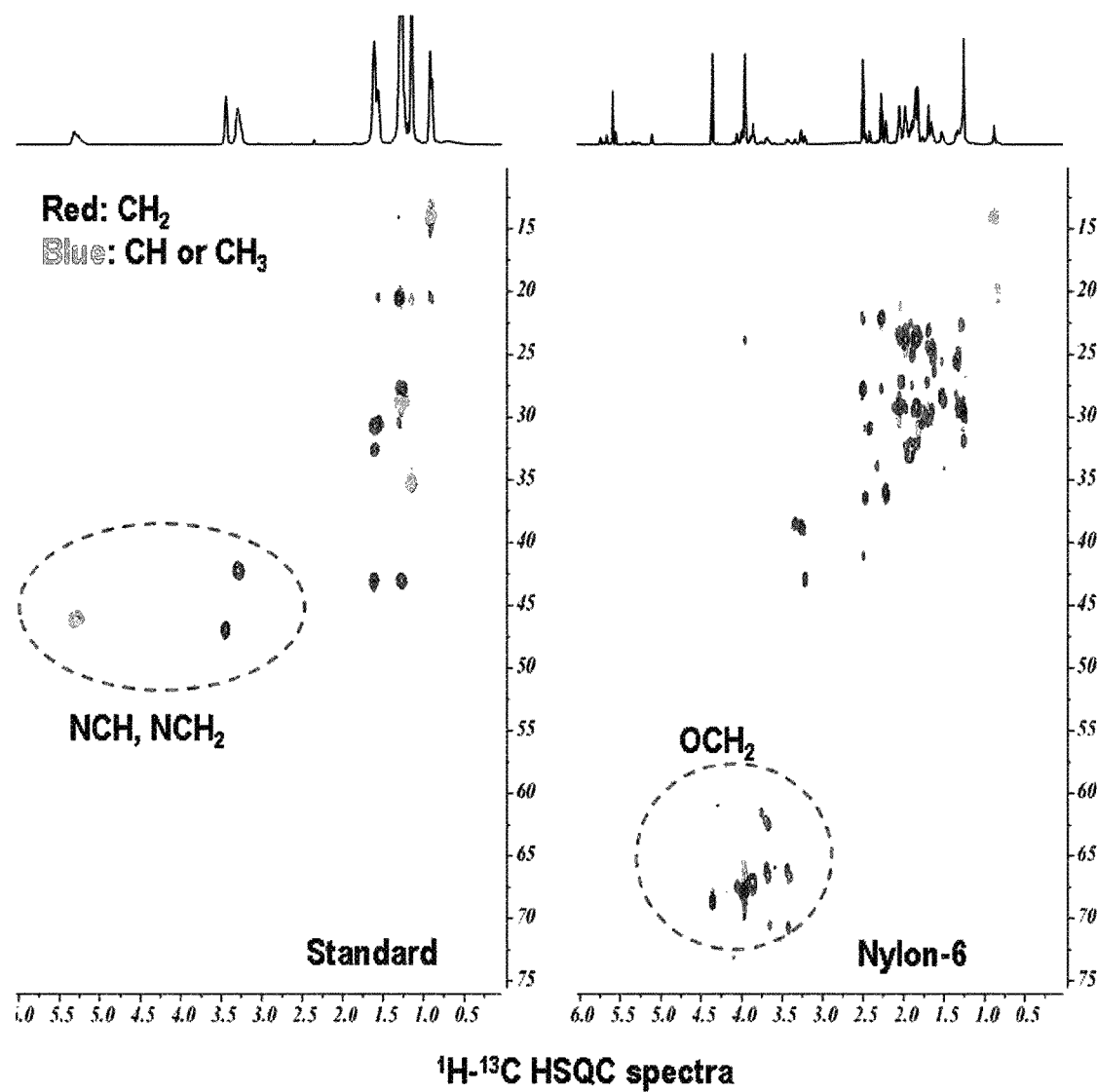

QUALITATIVE AND QUANTITATIVE ANALYSIS METHOD FOR HIGH MOLECULAR WEIGHT ADDITIVE BY USING SIZE-EXCLUSION CHROMATOGRAPHY-PYROLYSIS-GAS CHROMATOGRAPHY/MASS SPECTROMETRY

CROSS-REFERENCE TO RELATED APPLICATIONS

The present application is a national phase entry under 35 U.S.C. § 371 of International Application No. PCT/KR2019/013248, filed on Oct. 10, 2019, which claims priority from Korean Patent Application Nos. 10-2018-0120966, filed on Oct. 11, 2018, and 10-2019-0124406, filed on Oct. 8, 2019, the entire disclosures of which are incorporated by reference herein.

BACKGROUND OF THE INVENTION

1. Field of the Invention

The present invention relates to qualitative and quantitative analysis methods of polymer resins including high molecular weight additives, and an analysis system used in the method, more particularly to a method for obtaining qualitative and quantitative information of high molecular weight additives in polymer resins by using continuously connected size exclusion chromatography (SEC)—pyrolysis-gas chromatography/mass spectrometer (Py-GC/MS) and an analysis system used in the method.

2. Description of the Related Art

In general, additives in the polymer resins are additionally separated by gas or liquid chromatography after pretreatment such as solvent extraction, soxhlet extraction or reprecipitation and subjected to analyze structure by spectroscopic analysis. However, the solvent extraction method uses excess solvents and requires a lot of time and manpower to determine the appropriate analytical process for each polymer material. In addition, in the case of high molecular weight additives, it is not easily to obtain composition information by chromatographic method due to the large molecular weight and macromolecular structure. In this case, additional experiments using MALDI-TOF MS (matrix assisted laser desorption ionization-time of flight mass spectrometry) or 2-dimensional nuclear magnetic resonance (NMR) spectroscopy may be attempted to obtain composition information. However, it is difficult to obtain composition information and the accuracy of quantitative information is poor in the case of small amounts of additives or mixtures.

Therefore, there is a need for obtaining analysis results of structures of high molecular weight additives, which was not easily obtained by analysis of the conventional chromatography, MALDI-TOF MS or NMR spectroscopy, and for the development of a method capable of measuring the content of high molecular weight additives in the polymer resins.

SUMMARY OF THE INVENTION

An object of the present invention is to provide qualitative and quantitative analysis methods of polymer resins including high molecular weight additives, which was not easy by the conventional chromatography, MALDI-TOF MS, NMR spectroscopy, and the like.

In order to achieve the above object, the present invention provides qualitative and quantitative analysis methods for polymer resins including high molecular weight additives, the method comprising separating a fraction of a polymer resin sample corresponding to a high molecular weight additive containing a piperidine or a morpholine moiety using size exclusion chromatography (SEC), pyrolizing the fraction in a pyrolysis-gas chromatography/mass spectrometer (Py-GC/MS) to decompose the fraction into compounds having relative low molecular weight and detecting fragment peaks derived from the piperidine or the morpholine moiety to obtain qualitative information of the high molecular weight additive, and obtaining quantitative information of the high molecular weight additive based on the sum of the areas of the fragment peaks.

The present invention also provides an analysis system for use in qualitative and quantitative analysis of high molecular weight additives in polymer resins, including a size exclusion chromatography apparatus, automated sample collecting and injecting device, a pyrolyzer, and a gas chromatography/mass spectrometer.

Effect of the Invention

According to the present invention, it is possible to qualitatively and quantitatively analyze a high molecular weight additive by pyrolyzing a polymer resin containing a high molecular weight additive having a moiety such as piperidine or morpholine into a low molecular weight compound to obtain a mass spectrum and detecting fragment peaks derived from the moiety in the mass spectrum.

BRIEF DESCRIPTION OF THE DRAWINGS

FIGS. 1a-c show, respectively, size exclusion chromatography (SEC) data, total ion chromatogram (TIC) data, and pyrolysis-gas chromatography/mass spectrometer (Py-GC/MS) data for a Chimasorb® 2020 standard and a polymer resin sample including Nylon-6 and Chimasorb® 2020.

FIG. 2 shows an estimated structure of Chimasorb® 2020 based on characteristic m/z values determined from mass spectroscoy.

FIGS. 3a-d show, respectively, SEC data, TIC data, and Py-GC/MS, and chemical structure of a Chimasorb® 119 standard.

FIGS. 4a-d show, respectively, SEC data, TIC data, Py-GC/MS data, and chemical structure of a Cyasorb® UV 3345 standard.

FIG. 5a shows Py-GC/MS SIM (selected ion monitoring) data for Chimasorb® 2020 standard for at concentrations of 1, 10, 20, and 40 mg/mL and a polymer resin sample including Nylon-6 and Chimasorb® 2020.

FIG. 5b shows mass spectra of a fraction at rentention times of 24.1, 26.6 and 28.2 min for a polymer resin sample including Nylon-6 and Chimasorb® 2020.

FIG. 6 shows a calibration line showing a sum of areas for fragment peaks (count) as a function of concentration for a Chimasorb® 2020 standard.

FIG. 7 shows a mass spectrum of a polymer resin sample including Nylon-6 and Chimasorb® 2020 obtained with matrix assisted laser desorption ionization—time of flight mass spectroscopy (MALDI-TOF MS).

FIG. 8a shows a $^1$H nuclear magnetic resonance (NMR) spectra for a Chimasorb® 2020 standard and a polymer resin sample including Nylon-6 and Chimasorb® 2020.

FIG. 8b shows a 2-dimensional $^1$H-$^{13}$C heteronuclear single quantum correlation (HSQC) spectra for a Chimasorb® 2020 standard and a polymer resin sample including Nylon-6 and Chimasorb® 2020.

DETAILED DESCRIPTION OF THE INVENTION

Hereinafter, the present invention will be described in detail.

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the prior art, it was difficult to easily obtain composition information of high molecular weight additives in polymer resins by chromatography due to their large molecular weight and macromolecular structure, and it was not easy to obtain analytical information through additional experiments using MALDI-TOF MS or 2-dimensional nuclear magnetic resonance (NMR) spectroscopy. Accordingly, there is a demand for an analysis method capable of obtaining qualitative and quantitative analysis results of the high molecular weight additive in the polymer resin.

The present invention provides an analysis method and an analysis system in the method, in which SEC-Py-GC/MS data of high molecular weight additives in polymer resins is obtained using a SEC-Py-GC/MS system, the polymer resins including the high molecular weight additives to be analyzed are pyrolyzed to low molecular weight compounds to detect the compound, thereby obtaining qualitative and quantitative analysis results of the high molecular weight additives.

Specifically, the present invention relates to a method of analyzing a polymer resin sample, the polymer resin sample including a polymer resin and a high molecular weight additive containing a piperidine or a morpholine moiety, the method comprising:

separating a fraction of the polymer resin sample using size exclusion chromatography (SEC), wherein the fraction corresponds to a high molecular weight additive;

pyrolyzing the fraction in a pyrolysis-gas chromatography/mass spectrometer (Py-GC/MS) to obtain mass spectrum of the pyrolized fraction;

identifying the structure of the high molecular weight additive using fragment peaks derived from the piperidine or the morpholine moiety in the mass spectrum; and determining an amount of the high molecular weight additive in the polymer resin sample, relative to the total weight of the sample based on the sum of the areas of the fragment peaks.

According to the present invention, first, a high molecular weight additive containing a moiety such as piperidine and morpholine in a polymer resin sample is introduced into SEC and a specific fraction corresponding to the high molecular weight additive among the fractions from the SEC is introduced into Py-GC/MS. The pyrolyzed fraction appears a lot of peaks in GC results, of which the characteristic peaks are detected to obtain a mass spectrum.

The characteristic fragment peaks identified in the mass spectrum are derived from a moiety such as piperidine and morpholine of the high molecular weight additive. By comparing the m/z value of each fragment peak with the characteristic m/z value of a standard, the structure of the high molecular weight additive can be identified. The standard being a solution of the high molecular weight additive. Subsequently, sum of the areas of the fragment peaks in the mass spectrum is calculated and compared to a calibration line, wherein the calibration line represents a sum of peak areas of the fragment peaks in the standard as a function of the concentration of the standard.

In one embodiment, the molecular weight of the high molecular weight additive may be 1,000 to 4,000 g/mol, specifically 1,300 to 3,500 g/mol.

In one embodiment, the high molecular weight additive is a hindered amine light stabilizer (HALS).

In one embodiment, the hindered amine light stabilizer may be Chimasorb® 2020, Chimasorb® 119 and Cyasorb® UV 3345.

In one embodiment, the high molecular weight additive is Chimasorb® 2020 and characteristic fragment peaks containing its piperidine moiety appear at m/z values of 58, 98, 124 and 140.

In one embodiment, the high molecular additive is Chimasorb® 119 and characteristic fragment peaks containing its piperidine moiety appear at m/z values 58, 98, 124, 140 and 152.

In one embodiment, the high molecular additive is Cyasorb® UV 3345 and characteristic fragment peaks containing its morpholine moiety appear at m/z values of 58, 98, 124, 138, 267, 279 and 336.

In one embodiment, the high molecular additive may be contained in an amount of 0.3 to 0.7% by weight based on the weight of the polymer resin sample.

In one embodiment, the polymer resin may be a water insoluble resin.

In one embodiment, the mobile phase of size exclusion chromatography in the step (1) may be a nonpolar solvent such as water, methanol, acetonitrile (AN), tetrahydrofuran (THF) and the like. In other embodiment, the mobile phase is tetrahydrofuran (THF).

In one embodiment, in the size exclusion chromatography (SEC), the polymer sample is automatically collected at 0.5 to 1 min interval, for example at 0.7 min interval in the range of 15 to 30 minutes after the start of separation.

In one embodiment, Ar or He is used as a carrier gas for pyrolysis.

In one embodiment, the pyrolysis is performed by raising the temperature from 100 to 800° C. at a rate of 50 to 80° C./sec. For example, the pyrolysis may be performed by raising the temperature from 100° C. to 600° C. at a rate of 60° C./sec and maintaining at 600° C. for 60 seconds.

In one embodiment, the components separated by size exclusion chromatography (SEC) are automatically collected in vials and injected into the subsequent analyzer connected in series.

In addition, the present invention provides an analysis system for use in qualitative and quantitative analysis methods of high molecular weight additives in polymer resins, including size exclusion chromatography apparatus, automated sample collecting and injecting device, pyrolyzer, and gas chromatography and mass spectrometry apparatus.

Hereinafter, preferred examples are provided to help the understanding of the present invention, but the following examples are merely illustrative of the present invention, and various changes and modifications within the scope and spirit of the present invention are apparent to those skilled in the art. It is natural that such changes and modifications fall within the scope of the appended claims.

EXAMPLES

1. Pretreatment of Sample and Standard 1.1 Pretreatment of Standard

Chimasorb® 2020 standard was completely dissolved in tetrahydrofuran (THF) at concentrations of 1, 10, 20 and 40 mg/mL, respectively.

Chimasorb® 119 standard and Cyasorb® UV 3345 standard were completely dissolved in THF at concentrations of 10 mg/mL.

1.2 Pretreatment of Sample 2 g of freeze-ground Nylon-6 resin was added to 10 mL of chloroform and shaken for 4 hours. The solution was centrifuged to precipitate the resin portion and then the solution was collected. The solvent was removed from the collected solution through $N_2$ purging at room temperature. Subsequently, 1 mL of THF was added thereto to dissolve completely and the solution was used as a sample solution. This sample contains Chimasorb® 2020 in an amount of 0.4% by weight.

2. SEC Analytical Condition

Analysis was performed using Prominence HPLC system of Shimadzu. As a column, PLgel MIXED-B (length 300 mm, I.D. 7.5 mm, particle size: 10 μm) and PLgel MIXED-C (length 300 mm, I.D. 7.5 mm, particle size: 5 μm) of Agilent were used. As a mobile phase, 100% tetrahydrofuran (for HPLC) was used, the injection amount was 50 μL and the flow rate was 1 mL/min. Six fractions were collected at 0.7 min interval in the range of 15.8 to 20.0 minutes after the start of separation.

3. Py-GC/MS Analytic Condition

Analysis was performed using GC/MS-QP2020 of Shimadzu. As a GC column, RTX™-5MS column (length 30 m, I.D. 0.25 mm, thickness 0.25 μm, capillary) was used, and helium (He) was flowed at 1.0 mL/min as a carrier gas of the pyrolyzer. The oven temperature was maintained at 50° C. for 5 minutes, and then heated up to 320° C. at 10° C./min and then maintained for 10 minutes. The temperature condition of the pyrolyzer was raised from 100° C. (0 min) at a rate of 60° C./sec and maintained at 600° C. for 60 seconds. Solvent vent time was 300 seconds.

4. Database of HALS-Based High Molecular Weight Additive

The LC-Py-GC/MS data for each standard of Chimasorb® 2020, Chimasorb® 119 and Cyasorb® UV 3345 was obtained and databased (D/B). Chimasorb® 2020 has a molecular weight from 2600 to 3400 g/mol and the characteristic m/z values of 58, 98, 124 and 140 have been identified (see FIG. 2 and FIG. 1c, respectively). For reference, the Chimasorb® 119 has a molecular weight of 2285.68 g/mol and the characteristic m/z values of 58, 98, 124, 140 and 152 have been identified (see FIGS. 3c-d). The Cyasorb® UV 3345 has a molecular weight of 1600 g/mol and the characteristic m/z values of 58, 98, 124, 138, 267, 279 and 336 have been identified (see FIGS. 4c-d).

Meanwhile, SEC and Py-GC/MS data for Chimasorb® 2020 are described with regard to Example 1 below.

Example 1: Qualitative Analysis of Chimasorb® 2020 by Using Continuously Connected SEC-Py-GC/MS As a sample, the pretreated nylon-6 sample as described in "1.2 Pretreatment of sample", comprising 0.4 wt % of Chimasorb® 2020 (molecular weight 2600 to 3400 g/mol) was introduced into SEC to separate Chimasorb® 2020. Then, the separated Chimasorb® 2020 was introduced into Py-GC/MS. From the GC of Chimasorb® 2020, a peak with a retention time of 28.2 minutes, which is identical to one of Chimasorb® 2020 standard, was detected and subjected to mass spectrometry. Characteristic peaks from a moiety containing piperidine in the mass spectrum were found at m/z values of 58, 98, 124 and 140.

SEC data of the Chimasorb® 2020 standard and the sample are shown in FIG. 1a, and total ion chromatogram (TIC) and mass spectrum of the gas generated in pyrolysis as Py-GC/MS data are shown in FIGS. 1b and 1c, respectively. Moreover, the estimated structure of Chimasorb® 2020 based on the m/z value of the mass spectrum as described above is shown in FIG. 2.

Example 2: Qualitative Analysis of Chimasorb® 2020

Fractions 3, 4 and 5 of the SEC of the Chimasorb® 2020 standard for each concentration (1, 10, 20 and 40 mg/mL THF) and the Nylon-6 sample were extracted at m/z value of 140 in Py-GC/MS SIM (selected ion monitoring). The linearity between concentration and peak area (count) was confirmed for the Chimasorb® 2020 standard detected in fractions 3, 4 and 5 ($R^2$=0.963).

For both the Chimasorb® 2020 standard and the Nylon-6 sample, three characteristic peaks (peaks 1, 2, and 3 in FIG. 5a) in Py-GC/MS for characteristic fraction 5 of SEC were identified as m/z value of 140 at retention times of 24.1 minutes, 26.6 minutes, and 28.2 minutes. From correlation between area count and concentration of each detected peak, the content of Chimasorb® 2020 in the Nylon-6 sample was calculated to be 0.49 wt %.

Py-GC/MS SIM data and mass spectrum of characteristic peaks of the Chimasorb® 2020 standard and the Nylon-6 sample for each concentration are shown in FIGS. 5a-b. Moreover, the calibration line of the peak area (count) according to the concentration for the Chimasorb® 2020 standard is shown in FIG. 6.

Comparative Example 1: Analysis of High Molecular Weight Additives by Using MALDI-TOF MS In this comparative example, Chimasorb® 2020 was qualitatively analyzed by using MALDI-TOF MS according to the prior art for the Nylon-6 sample including 0.4 wt % of Chimasorb® 2020 (molecular weight 2600 to 3400 g/mol) as in Example 1.

Two peaks ([M+H]$^+$=1062, 2425) at a interval of 1363 Da appeared in the mass spectrum obtained by MALDI-TOF MS for the nylon-6 sample, which could be assumed to correspond to Chimasorb® 2020. The mass spectrum is shown in FIG. 7, and the structural formula of Chimasorb® 2020 detected at [M+H]$^+$=1062 and 2425 is as follows:

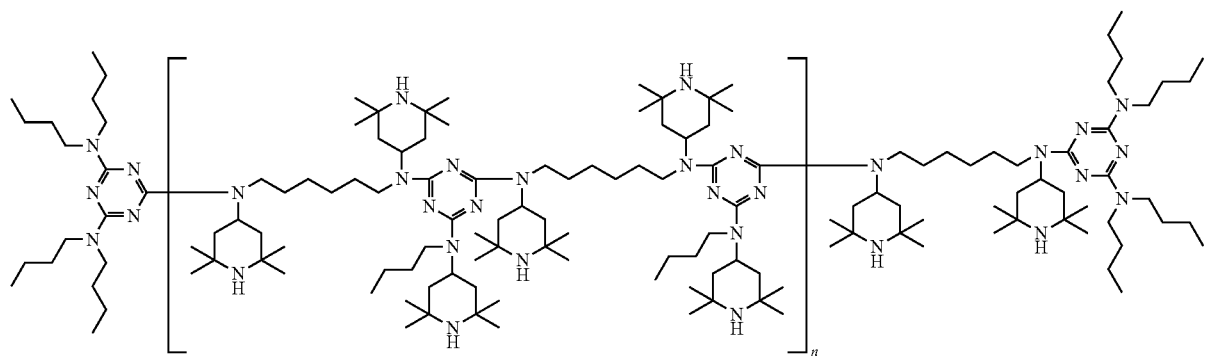

Molecular Weight = 1061.74[1364.21]n
Exact Mass = 1061[1363]n
Molecular Formula = C62H120N14[C80H150N18]n Comparative Example 2: Analysis of High Molecular Weight Additives by Using 2D NMR Spectroscopy In this comparative example, the Nylon-6 sample including 0.4 wt % of Chimasorb® 2020 (molecular weight 2600 to 3400 g/mol) as in Example 1 was pretreated by solvent extraction and Chimasorb® 2020 in the sample was analyzed by using 2D NMR spectrometry according to the prior art.

$^1$H NMR spectrum and two-dimensional $^1$H-$^{13}$C heteronuclear single quantum correlation (HSQC) spectrum obtained for the nylon-6 sample and the additive standard did not appear peaks relative to the high molecular weight additive in the polymer resin sample. The presence of components derived from additives in the solvent used in the solvent extraction was confirmed. The $^1$H NMR spectrum and the two-dimensional $^1$H-$^{13}$C HSQC spectrum are shown in FIGS. 8a-b, respectively.

In this comparative example, qualitative and quantitative analysis results could not be obtained because the amount of the additive was less than 1% by weight and the peak assignment was difficult due to the mixture with the solvent and the like used in the solvent extraction method.

As can be seen from the above examples and comparative examples, the quantitative analysis of the high molecular weight additive in the polymer sample by the conventional MALDI-TOF MS and the qualitative and quantitative analysis of the high molecular weight additive in the polymer sample by the 2D NMR spectroscopy are difficult to obtain accurate results. On the other hand, according to the present invention, it is possible to identify the structure and analyze the content of a high molecular weight additive by decomposing a polymer resin containing a high molecular weight additive having specific moiety such as pyrimidine and morpholine into a low molecular weight compound by using continuously connected exclusion chromatography—pyrolysis-gas chromatography/mass spectrometer.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method of analyzing a polymer resin sample, the polymer resins sample comprising a polymer resin and a high molecular weight additive containing a piperidine or a morpholine moiety, the method comprising the steps of:

separating a fraction of the polymer resin sample using size exclusion chromatography (SEC), wherein the fraction corresponding to the high molecular weight additive;

pyrolyzing the fraction in a pyrolysis-gas chromatography/mass spectrometer (Py-GC/MS) to obtain a mass spectrum of the pyrolyzed fraction;

identifying a structure of the high molecular weight additive by comparing m/z values for fragment peaks derived from the piperidine or the morpholine moiety in the mass spectrum to m/z values for fragment peaks derived from the piperidine or the mopholine moiety from a mass spectrum of a standard, the standard being a solution of the high molecular weight additive; and determining the amount of the high molecular weight additive in the polymer resin sample, relative to the total weight of the polymer resin sample by comparing a sum of areas of the fragment peaks to a calibration line, where the calibration line representing a sum of areas of the fragment peaks in the standard as a function of concentration of the standard, wherein the molecular weight of the high molecular weight additive is 1,000 to 4,000 g/mol.

2. The analysis method according to claim 1, wherein the high molecular weight additive is at least one hindered amine light stabilizer (HALS) selected from the group consisting of compounds of Formulas (I) to (III).

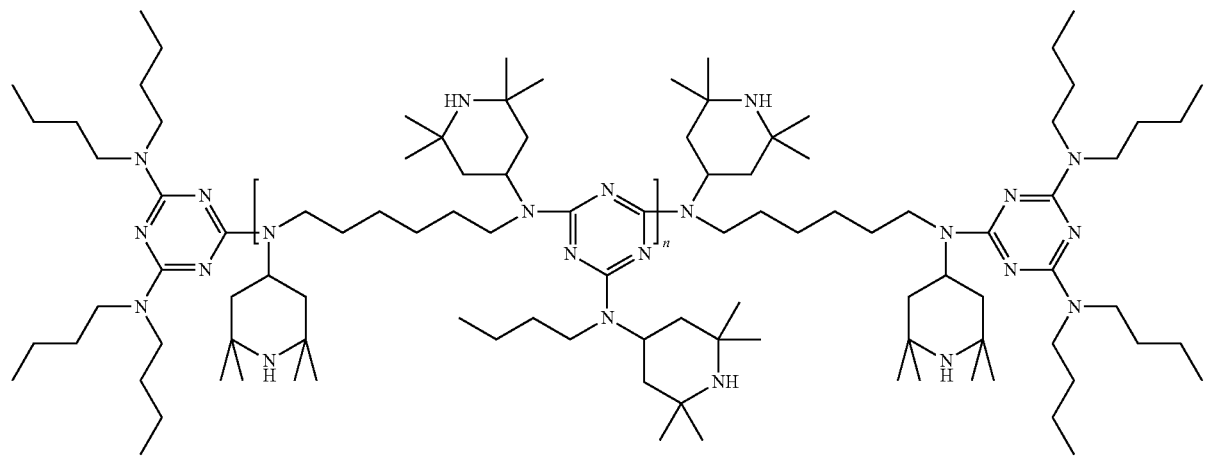
(I)
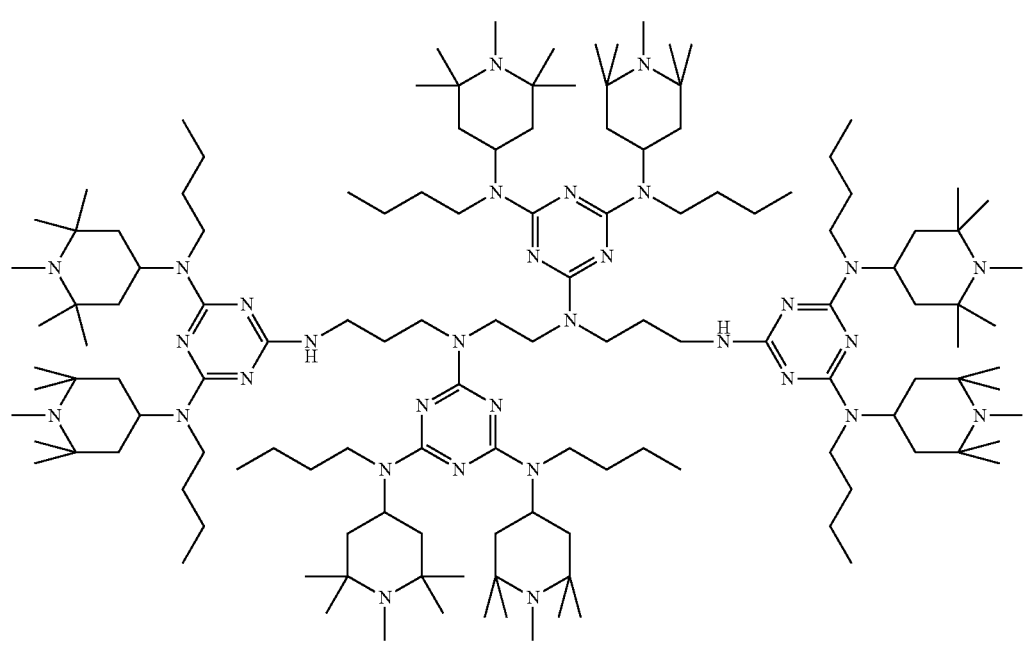
(II)
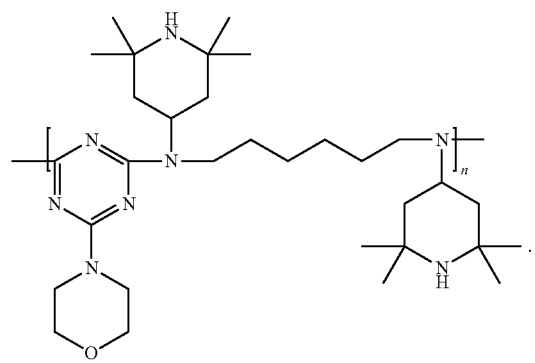
(III)

3. The analysis method according to claim 2, wherein the hindered amine light stabilizer is the compound of Formula (I).

4. The analysis method according to claim 1, wherein the high molecular weight additive is the compound of Formula (I), and
wherein the mass spectrum of the high molecular weight additive has the fragment peaks derived from the piperidine or the mopholine moiety at m/z values of 58, 98, 124 and 140.

5. The analysis method according to claim 1, wherein the high molecular additive is present in an amount of 0.3 to 0.7% by weight based on the weight of the polymer resin sample.

6. The analysis method according to claim 1, wherein the polymer resin is a water insoluble resin.

7. The analysis method according to claim 1, wherein a mobile phase of the size exclusion chromatography (SEC) is a solvent selected from the group consisting of water, methanol, acetonitrile (AN) and tetrahydrofuran (THF).

8. The analysis method according to claim 1, wherein in the size exclusion chromatography (SEC) the polymer resin sample is collected at 0.5 min to 1 min intervals in a range of 15 to 30 minutes after the start of the separation of the fraction.

9. The analysis method according to claim 1, wherein the pyrolysis of the fraction is performed by raising the temperature from 100° C. to 800° C. at a rate of 50° C./sec to 80° C./sec.

10. The analysis method according to claim 9, wherein the pyrolysis of the fraction is performed by raising the temperature from 100° C. to 600° C. at a rate of 60° C./sec and maintaining at 600° C. for 60 seconds.

11. An analysis system for performing the method according to claim 1, comprising:
a size exclusion chromatography apparatus;
an automated sample collecting and injecting device;
a pyrolyzer; and
a gas chromatography and mass spectrometer.

* * * * *